United States Patent [19]
Donahue

[11] 3,723,870
[45] Mar. 27, 1973

[54] DEVICE FOR MEASUREMENT OF PULSE-TO-PULSE CARRIER FREQUENCY SHIFT

[75] Inventor: Thomas H. Donahue, Los Angeles, Calif.

[73] Assignee: International Telephones and Telegraph Corporation, New York, N.Y.

[22] Filed: Nov. 18, 1970

[21] Appl. No.: 90,577

[52] U.S. Cl. ............... 324/82, 324/77 D, 324/78 R
[51] Int. Cl. ..................... G01r 23/02, G01r 23/16
[58] Field of Search ........... 324/78 R, 82, 77 H, 84; 332/20; 325/134; 331/44

[56] References Cited

UNITED STATES PATENTS

| 3,357,021 | 12/1967 | Allen | 324/84 X |
| 3,416,077 | 12/1968 | Lacy | 324/84 X |
| 2,882,395 | 4/1959 | White | 324/78 R |

FOREIGN PATENTS OR APPLICATIONS

| 1,028,738 | 5/1966 | Great Britain | 324/82 |

*Primary Examiner*—Alfred E. Smith
*Attorney*—C. Cornell Remsen, Jr., Walter J. Baum, Paul W. Hemminger, Charles L. Johnson, Jr. and Thomas E. Kristofferson

[57] ABSTRACT

A system for the instantaneous measurement of the carrier frequency in a pulsed radar system, particularly useful in frequency stability analysis of the output of self-excited microwave frequency generators, such as magnetrons, etc. A dispersive delay line, preferably of the type operative in the intermediate frequency domain is employed with appropriate down-conversion ahead of the delay line input. A cathode ray display device horizontal sweep is generated synchronously with the magnetron PRF and the output of the dispersive delay line is presented in the appearance of spectral lines on the vertical deflection coordinate thereof. The dispersive delay line inherently provides a frequency time delay conversion so that the cathode ray display device may be calibrated in terms of frequency.

8 Claims, 1 Drawing Figure

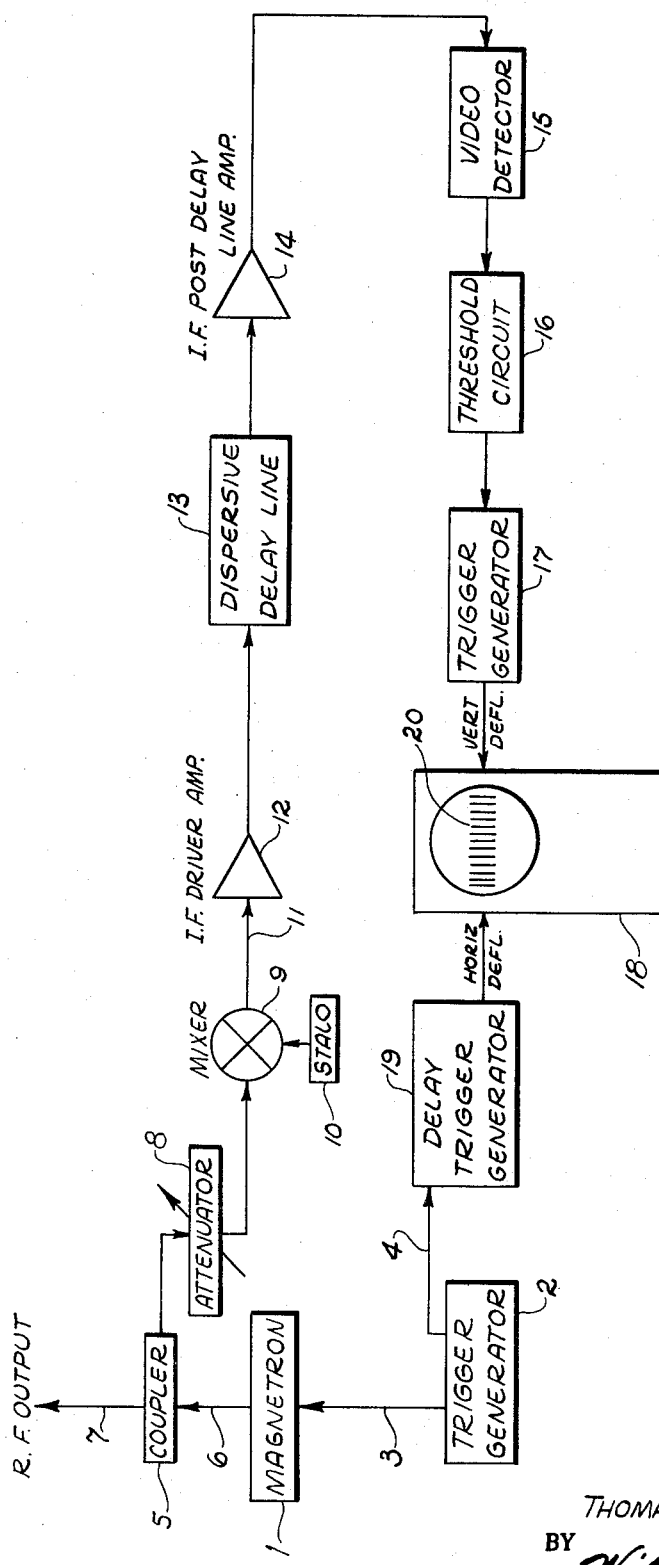

3,723,870

DEVICE FOR MEASUREMENT OF PULSE-TO-PULSE CARRIER FREQUENCY SHIFT

BACKGROUND OF THE INVENTION

1. Field of the Invention

The present invention relates to instantaneous frequency measurement in a pulsed system and, more particularly, to accurate measurements of that type in pulsed microwave generating systems.

2. Description of the Prior Art

In the prior art, specialized devices are extant for measuring the frequency of a microwave signal including the carrier frequency of a pulsed system. Such pulsed systems are commonly found in the radar arts.

In the prior art, approximate measurement of frequencies of the GHz realm (pulsed or CW) has been accomplished by means of calibrated resonant cavities and similar devices. Methods of frequency measurements involving cycle counting, which are extremely accurate at lower frequencies, are not adaptable in the microwave range.

Various attempts have been made to instrument accurate frequency measuring devices to measure the carrier frequencies of pulsed radar or similar pulsed microwave systems. Many of these are either relatively inaccurate, or so cumbersome and expensive as to be disadvantageous from that point of view.

In one particular prior art instrumentation for measuring the carrier frequency of a radar pulse, two cascaded hybrids with unequal delay lines inserted between the two output ports of the first hybrid and the input ports of the second hybrid, provide the frequency sensing element. The power ratio between the two output ports of the second hybrid is a relatively sensitive function of frequency. The measurement of the log of this power ratio is converted to a time difference measurement $\Delta t$ by comparison with an injector signal decaying exponentially. This $\Delta t$ quantity is linearly proportional to frequency over an octave of frequency variation.

The so-called dispersive delay line which is an element in the new combination of the present invention is, of itself, a prior art device developed for, and used in, pulse compression FM radar systems. A particular type of dispersive delay line, particularly useful in the preferred instrumentation of the present invention, will be identified and described in more detail as this description proceeds.

The manner in which the present invention overcomes the disadvantages of the prior art and produces a new and useful structure exhibiting particular advantages will be understood from the description hereinafter.

SUMMARY OF THE INVENTION

The present invention relies on the well-controlled and highly repeatable characteristics of dispersive delay lines which were developed for FM pulse compression radar systems. Basically these devices, which operate in the frequency realm of typical IF frequencies employed in radar systems, are acoustic delay-line devices excited by input transducers and with transducer output pickoff. Most dispersive delay lines are designed to have a linear change of delay in their usable frequency bands, however, linearity, although desirable from a calibration point of view, is not an absolute necessity in connection with the instrumentation of the present invention.

One of the more common dispersive delay lines is the so-called dispersive strip line which utilizes the first longitudinal mode of a metal strip. Low frequency lines of this type are commonly made from aluminum or steel and higher frequency lines from steel. The transducers are normally piezoelectric ceramic.

Another, and preferable type, insofar as the instrumentation of the present invention is concerned, is the so-called diffraction dispersive delay line which uses acoustic diffraction gratings to spatially distribute the fourier frequency components of a waveform. Usually such lines are designed so that this spatial distribution results in a linear delay versus frequency characteristic, since linearity is particularly desirable in pulse impression applications. Moreover, the bandwidth over which linearity is possible can be on the order of 50 percent, much larger than that possible in other types of dispersive delay lines. Also, the center frequency can go as high as 100 MHz. Such a device, having a frequency versus delay slope of 1 MHz/$\mu$sec., was constructed for the present invention.

The reader not specifically familiar with dispersion-type delay lines, is directed to the technical literature. For example, lines of the type required for use in the system of the present invention are described in Electronic News (New Circuits section) in the Monday, Aug. 7, 1967 issue. Electronic News is a publication of Fairchild Publishing Co. (New York). The developers of the device described were concerned primarily with improved radar resolution, notwithstanding the fact that its characteristics are used for another purpose in the present combination. That reference will also provide an insight into the availability of dispersion-type delay lines in various frequency ranges, such as in the microwave range. Constructed in the microwave range, the down-conversion described herein would be unnecessary.

Basically, the preferred embodiment of the present invention involves the sampling, through a coupler and attenuator as necessary, of the output of the magnetron or other pulse microwave generator; the down-conversion (where the VHF type of dispersive delay line is used); application to the dispersive line itself and display of the delayed pulse output against a horizontal sweep on a cathode ray indicator device. The said horizontal sweep is synchronously generated with respect to the magnetron pulses. Thus, the characteristics of the dispersive delay line are employed to convert frequency variations in the magnetron output into time variations displayable in real time much like a spectral line display.

The cathode ray sweep will be linear as long as the frequency-versus-delay characteristic of the dispersive delay line is linear, but in any event, the said horizontal sweep is readily calibrated for a direct frequency reading. Other aspects of the invention and a specific description of a preferred embodiment follow hereinafter.

BRIEF DESCRIPTION OF THE DRAWING

The single FIGURE drawing illustrates a circuit block diagram for a system in accordance with the present invention.

DESCRIPTION OF THE PREFERRED EMBODIMENT

Referring now to the FIGURE, a self-excited microwave generator labeled "magnetron" is illustrated at 1. This device is well known as the most common microwave power oscillator used in radar systems. A trigger generator 2 is to be understood to contain the usual timing circuits establishing the pulse repetition frequency of the system and also the usual pulse modulator circuitry, so that the signal on lead 3 is a high power level pulse train which supplies the energy, resulting in the generation of high power level microwave oscillations in 1.

The present system is adapted to bench testing, as well as to active system monitoring, and accordingly, the RF output from lead 6 would normally pass mostly through the coupler 5 and via the lead 7 either to an antenna or to a dummy load (in the case of bench testing). The coupler 5 singles out a relatively small amount of this energy and diverts it through a variable attenuator 8 to the mixer 9. This attenuator 8 provides attenuation as necessary in order that the level of radio frequency power supplied to the mixer 9 is appropriate for the type of mixer used. Normally, such mixers are radar receiving components and, as such, operate at low power levels, although higher power level mixing is well known in the art. The "stalo" 10 is the system local oscillator and is identified as a "stalo" because of the desirability of maintaining a high order of stability in this component. It will be seen that drift, or instability, in the local oscillator 10 would produce errors in the measurement. The technology involved in the construction of such a stable oscillator is well known in the radar arts, since such devices are normally used in moving target indicator systems. The mixer output lead 11 is down-converted to a standard IF band for radar receivers. Normally this IF band is in the VHF region. The IF driver amplifier 12 functions to boost the power level of the down-converted signal on lead 11. Appropriate levels of power input for a device such as the dispersive delay line 13 are prescribed by manufacturers of these devices and are well understood in the prior art.

As will have been previously understood, the dispersive delay line 13 is basically a frequency sensitive device which converts pulse carrier frequency changes to changes of pulse envelope delay at its output. In one particular instrumentation of the present invention, a line having a conversion constant, or sensitivity, of 1 MHz/$\mu$sec. was used. Thus, a pulse output having a real time position which is variable with respect to the time of occurrence of the magnetron pulse on 6 is delivered to the IF post delay line amplifier 14. This amplifier compensates for attenuation experienced in the line 13 and builds the signals therefrom to an acceptable voltage level to operate a straightforward video detector 15. Up to 15 the signal will be understood to have been present in the VHF realm which is the IF frequency for the system. Passing out of 15, the video envelope of the pulses is subjected to a threshold circuit 16.

It is a characteristic of a dispersive delay line employed in the manner illustrated herein, that fourier components of the input pulse thereto, appear at the output. The threshold of the circuit 16 can be said to eliminate the lower amplitude sideband components thus produced, as well as a certain amount of the inherent noise present in the signals. The threshold circuit 16 output may be standardized in trigger generator 17. Thus, although there may be some variation in the width of signals passed on by the threshold circuit 16, a standard and preferably narrower trigger signal passing from 17 to the vertical deflection coordinate input of a cathode ray oscillograph 18 produces an easily read display against the calibration thereon. Returning now to the trigger generator or system timing circuits in 2, it will be noted that a separate trigger output 4 supplies a trigger pulse of the same frequency as the signals on 3 to delay trigger generator 19. This trigger on 4 may actually precede the corresponding pulses on 3, so that a minimum delay setting in 19 could be made to start the horizontal sweep of the oscillograph 18 ahead of pulses from the dispersive delay line 13 arriving at the vertical deflection coordinate input of the oscillograph 18 via the intervening circuitry including 14 through 17. Thus, nominal magnetron frequency lines will appear near the center of the CRT display so that variation on either side may be presented. Actually then, the adjustment of the delay trigger generator 19 may be thought of as a matter of oscillograph calibration. For clarity, frequency calibration marks 20 are exaggerated somewhat on the FIGURE. If the dispersive delay line sensitivity is 1 MHz/$\mu$sec., as aforesaid, and the sweep speed on the oscillograph 18 is 10 $\mu$sec./cm., the overall system sensitivity (from magnetron frequency change to horizontal pulse displacement on the face of the oscillograph 18) is 10 KHz/cm.

Obviously, the system of the present invention can provide even greater sensitivity if a dispersive line having a slope or sensitivity of less than the 1 MHz/$\mu$sec. is used. A sensitivity in the delay line of 100 KHz/$\mu$sec., for example, would increase the sensitivity a full order of magnitude to 1 KHz/cm.

From an understanding of the foregoing, it will be appreciated that the present invention is well adapted to the measurement of pulse0to-pulse frequency shift of a magnetron or other microwave device. Information of this type is valuable not only from a bench testing point of view, but also to predict or monitor magnetron MTI performance capability or suitability during an actual system monitoring situation.

From an understanding of the foregoing, those skilled in this art will recognize certain possible modifications and additional applications for the system of the present invention. One example of an additional use would be the monitoring of the microwave frequency of the deliberately programmed frequency "-hopping" radar.

It is to be understood that the present invention is not to be regarded as limited by the illustration or the specific description, these being intended to be illustrative and typical only.

What is claimed is:

1. Apparatus for measurement of the frequency of the energy output from a pulsed radio frequency generator, comprising:
    a mixer and local oscillator of substantially invariant frequency connected to receive a portion of said energy output from said pulsed radiofrequency generator to produce mixer output pulses;
    a dispersive delay line operative within the frequency domain of said mixer output pulses and connected to receive said mixer output pulses to produce corresponding delay line output pulses discretely time delayed by an amount which is a function of the individual frequencies of said converter output pulses;

a cathode ray indicating device including means for generating and applying a sweep in a first deflection coordinate of said indicating device;

synchronizing means for controlling the initiation of said sweep at a predetermined time with respect to said radio-frequency generator output pulses, said synchronizing means also controlling the initiation of said energy pulses from said radio-frequency generator; and means for applying said delay line output pulses to the second deflection coordinate of said indicating means to produce a presentation which may be calibrated in frequency along the axis corresponding to said first deflection coordinate.

2. A system for instantaneous measurement of the frequency generated by a pulsed radio frequency generator, comprising:

a superheterodyne mixer and a local oscillator of substantially constant frequency operatively associated therewith;

means for coupling a portion of the pulsed output energy from said generator to said mixer, whereby said mixer produces pulses of energy at intermediate frequency;

a dispersive delay line responsive to said intermediate frequency pulses, for producing output pulses from said delay line which are discretely delayed with respect to the corresponding input pulses to said delay line as a function of frequency of said radio frequency generator during each of said input pulses;

a cathode ray indicating device including a sweep applied to one deflection coordinate of said indicating device;

synchronizing means connected for initiating said sweep at a predetermined time related to the occurrence of each of said pulses from said generator; and means for applying said delay line output to the other deflection coordinate of said indicating device.

3. The invention defined in claim 2 including a video detector connected to receive the output pulses of said delay line thereby to reduce said pulses to the video frequency realm before application to said other deflection coordinate of said indicating device.

4. Apparatus according to claim 3 including a threshold circuit and a following trigger generator connected between said video detector and said other deflection coordinate of said indicating device, whereby said delay line output pulse may be passed only to the extent that they exceed a predetermined amplitude, and whereby said pulses thus passed are formed into relatively narrow pulses of uniform duration so as to be readily compared to any frequency calibrations on said indicating device.

5. Apparatus according to claim 3 in which said dispersive delay line is defined as being of the acoustic diffraction grating type.

6. Apparatus according to claim 5 in which said diffraction grating type of dispersive delay line is defined as being made in the form of fused quartz plates.

7. Apparatus according to claim 6 including a predeterminable delayable trigger generating circuit between said means for synchronizing the initiation of said sweep and said means for generating and applying said sweeps to provide calibration of said cathode ray indicating device.

8. Apparatus according to claim 6 including an amplifier preceding said dispersive delay line to provide an adequate level of drive power therefor, and an additional amplifier after said dispersive delay line to compensate for attenuation therein.

* * * * *